(12) United States Patent
Chung et al.

(10) Patent No.: US 8,715,738 B2
(45) Date of Patent: May 6, 2014

(54) FULLERENE-SILICA NANOPARTICLES WITH IMPROVED FLUORESCENCE, PREPARATION METHOD THEREOF AND USE THEREOF

(75) Inventors: Bong Hyun Chung, Daejeon (KR); Jinyoung Jeong, Daejeon (KR); Nam Woong Song, Daejeon (KR)

(73) Assignee: Korea Research Institute of Bioscience and Biotechnology, Daejeon (KR)

( * ) Notice: Subject to any disclaimer, the term of this patent is extended or adjusted under 35 U.S.C. 154(b) by 561 days.

(21) Appl. No.: 12/993,908

(22) PCT Filed: Jan. 6, 2009

(86) PCT No.: PCT/KR2009/000045
§ 371 (c)(1),
(2), (4) Date: Jan. 7, 2011

(87) PCT Pub. No.: WO2009/142378
PCT Pub. Date: Nov. 26, 2009

(65) Prior Publication Data
US 2011/0171097 A1 Jul. 14, 2011

(30) Foreign Application Priority Data
May 21, 2008 (KR) .......... 10-2008-0047070

(51) Int. Cl.
*A61K 9/14* (2006.01)
(52) U.S. Cl.
USPC .......................................................... 424/489
(58) Field of Classification Search
None
See application file for complete search history.

(56) References Cited

U.S. PATENT DOCUMENTS 5,308,481 A * 5/1994 Stalling et al. ............. 210/198.2

FOREIGN PATENT DOCUMENTS

| EP | 1 973 142 A1 | 9/2008 |
| KR | 1020060038938 A | 5/2006 |
| KR | 1020060125508 A | 12/2006 |
| KR | 1020080033335 A | 4/2008 |

OTHER PUBLICATIONS

Davydenko, et al., "Sensibilization of fullerene C60 immobilized at silica nanoparticles for cancer photodynamic therapy." Journal of Molecular Liquids, vol. 127, No. 1-3, pp. 145-147 (2006). XP025052010.
Gumanov, et al., "Preparation and properties of sorbents based on silica gel containing covalently linked fullerene C60," Russian Chemical Bulletin, vol. 45, No. 4, pp. 768-770 (Apr. 1996). XP008081813.
Peng, et al., "Synthesis of Fullerene-Containing Sol-Gel Glasses," Journal of Sol-Gel Science and Technology, vol. 22, No. 3, pp. 205-218, (2001). XP001101202.
Zhu, et al., "Changes in structure and electronic states of fullerenes incorporated in silica aerogel", J. Phys. Chem Solids, vol. 59, No. 5, pp. 819-824, 1998.
Lamrabte, et al., "Evidence of confinement of fullerene C60 in microporous VPI-5 zeolite", Chemical Physics Letters, 295, pp. 257-265, 1998.
Peng, et al., "Synthesis of fullerene-containing sol-gel glasses", Journal of Sol-Gel Science and Technology 22, pp. 205-218, 2001.
Patwardhan, et al., "Synthesis of C60 fullerene-silica hybrid nano structures", Journal of Inorganic and Organometallic Polymers, vol. 12, No. 1/2, pp. 49-55, 2002.
Whitsitt, et al., "Silica coated fullerenols: seeded growth of silica spheres under acidic conditions", CHEM. COMMUN., pp. 1042-1043, 2003.
Innocenzi, et al. "Fullerene-Based Organic-Inorganic Nanocomposites and Their Applications," Chem. Matter. 2001, 13, 3126-3139 Published on Web Oct. 15, 2001.

* cited by examiner

*Primary Examiner* — Paul Dickinson
(74) *Attorney, Agent, or Firm* — Lucas & Mercanti, LLP

(57) ABSTRACT

The present invention relates to fullerene-silica nanoparticles with improved fluorescence, a preparation method of the fullerene-silica nanoparticles, and use thereof. More specifically, the present invention relates to fullerene-silica nanoparticles with improved fluorescence in which fullerene and silica are covalently linked, a preparation method of the fullerene-silica nanoparticles, and use thereof. The preparation method of the fullerene-silica nanoparticles comprises the steps of: adding a surfactant to a non-polar organic solvent and a polar solvent and stirring them to form reverse micelles (step 1); adding fullerene to the reverse micelles formed in the step 1 and stirring them (step 2); and adding a silica precursor and a catalyst to a reaction solution containing the fullerene prepared in the step 2 and stirring them to prepare fullerene-silica nanoparticles (step 3). According to the present invention, fullerene-silica nanoparticles in the form of a uniform spherical shape of tens of nanometers can be prepared. As such prepared fullerene-silica nanoparticles have a large surface area due to a nanometer-sized structure, they have good reactivity. Compared with heavy metals or metal nanoparticles, the fullerene-silica nanoparticles, because of using silica, are harmless to a living body. Further, as the fullerene-silica nanoparticles exhibit strong fluorescence, they can be used as a contrast agent for in-vivo imaging or as a drug delivery carrier.

16 Claims, 8 Drawing Sheets

FULLERENE-SILICA NANOPARTICLES WITH IMPROVED FLUORESCENCE, PREPARATION METHOD THEREOF AND USE THEREOF

CROSS-REFERENCE TO RELATED APPLICATIONS

This application is a 371 of PCT/KR2009/000045 filed on Jan. 6, 2009, which claims the benefit of Korean Application No. 10-2008-0047070 filed on May 21, 2008, the contents of each of which are incorporated herein by reference.

TECHNICAL FIELD

The present invention relates to fullerene-silica nanoparticles with improved luminescence, a preparation method and a use thereof.

BACKGROUND ART

Buckminsterfullerene ($C_{60}$ fullerene) is a stable carbon molecule in the form of sphere, and composed of 60 carbons. In the $C_{60}$ fullerene, all carbon has same conditions because it forms icosahedral structure, this is confirmed by the single peak of $^{13}$C-NMR. Since $C_{70}$ and $C_{80}$ fullerenes as well as $C_{60}$ fullerene can be synthesized in the limited amount, $C_{60}$ is mainly synthesized and studied.

Most fullerene molecules are in the form of almost sphere symmetry and are nonpolar, so that they do not dissolve in polar solvent such as water or alcohol, but dissolve in nonpolar solvent such as benzene or toluene. Also, fullerene molecules are very sensitive to light. Due to such photosensitive property of the fullerene which turns to excited state by light, fullerene can easily be radical or photo-sensitizers. The electro-chemical properties of fullerene are very useful and 6 reversible oxidation-reduction reactions are available in solution. Also, the industrial availabilities and practical abilities of fullerene have recently gained increasing attention due to unique structure and hard property, and superconductivity of fullerene mixture with alkyl metals.

As mentioned above, fullerene is very sensitive to light. To be specific, the light absorption is particularly high at ultraviolet regions (213, 257, 329 nm). Yet, fluorescent property of Fullerene, which can be represented as quantum efficiency (QE) of fluorescence, has been reported relatively low.

The quantum efficiency of fluorescence indicates the number of fluorescence photons emitted per absorbed photons. QE of fullerene is approximately $1 \sim 2 \times 10^{-4}$ at atmospheric temperature. Due to such low efficiency of fluorescence, there are few cases that utilize fluorescence of fullerene. Further, despite the optical, electrical properties, fullerene has difficulties for its applications which are, mainly, low solubility to organic solvents or low self agglomeration. In particular, fullerene is so sensitive to the surrounding environment that its physical and chemical properties are easily changeable. Therefore, various regulating methods of fullerene have been developed.

The above methods include doping fullerene in host matrix, keeping fullerene in porous inorganic materials, or using sol-gel materials. The sol-gel process is particularly useful to synthesize fullerene nano-composite with low reaction temperature and relatively easy chemical reactions. Also, the methods of fullerene-silica aerogel composite (Zhu et al. J. Phys. Chem. Solids 59, 819, 1998), incorporation of fullerene into porous VIP-5 Zeolite (Lamrabte et al. Chem. Phys. Lett. 295, 257, 1998), or sol-gel process of glass containing fullerene (Peng et al. J. Sol-Gel Sci. Tech, 22, 205, 2001) have been proposed. As explained above, although the fullerene-silica composite has been prepared to be utilized as optical materials based on the unique optical properties of fullerene, few has been developed to actual application. Meanwhile, the fullerene composites prepared by the above methods are obtained not in the form of nano-particles but as a bulk.

In recent, nano science has gained the spotlight, and study of synthesizing nanoparticles with fullerene has been conducted. Some examples include using fullerene derivatives to synthesize a fulllerene-silica hybride nano composite (Patwardhan et al. J. Inorganic and Organometallic polymers, 12, 49, 2002), and coating fullerene containing hydroxyl group with silica under the acidic condition (Whitsitt et al, Chem. Comm. 1042, 2003).

However, the fullerene-silica nanocomposites have irregular sizes and shapes, fullerene and silica are linked with separate linkers, and the fluorescence properties of the fullerene-silica nanocomposite have not been fully studied.

Therefore, to solve the above problems, there are needs for the synthesis of uniform fullerene-silica nanoparticles sized tens of nanometers, and studies an the optical properties of fullerene-silica nanoparticles, especially the fluorescence properties of the fullerene-silica nanoparticles.

The present inventors have been studying the preparation of fullerene-silica nanoparticles in uniform shape, and completed the present invention by discovering that by synthesizing fullerene-silica nanoparticles in the uniform shape with the method of reverse micro emulsion, in which the fullerene and silica are directly linked without requiring linkers, the synthesized nanoparticles exhibit strong fluorescence and thus can be used as a bioimaging agent or as a drug delivery carrier.

DISCLOSURE

Technical Problem

In one embodiment, fullerene-silica nanoparticles of nanometer size in uniform shape are provided.

In another embodiment, a preparation method of the fullerene-silica nanoparticles is provided.

In yet another embodiment, a bioimaging agent including the fullerene-silica nanoparticles is provided.

Technical Solution

To achieve the above-mentioned objects of the present invention, one embodiment of the present invention provides fullerene-silica nanoparticles with improved fluorescence in which fullerene and silica are covalently linked.

Also, in another embodiment, the preparation method of the fullerene-silica nanoparticles is provided, comprising the steps of: adding a surfactant to a non-polar organic solvent and a polar solvent and stirring them to form reverse micelles (step 1);

adding fullerene to the reverse micelles formed in step 1 and stirring them (step 2); and adding a silica precursor and a catalyst to a reaction solution containing the fullerene prepared in the step 2 and stirring them to prepare fullerene-silica nanoparticles (step 3).

In yet another embodiment, a bioimaging agent including the fullerene-silica nanoparticles is provided.

Advantageous Effects

According to one embodiment, fullerene-silica nanoparticles in the form of a uniform spherical shape of nanometer size is provided, in which the fullerene-silica nanoparticles include various fullerenes such as $C_{70}$, $C_{80}$ fullerenes as well as $C_{60}$ fullerene. As such prepared fullerene-silica nanoparticles have a large surface area due to a nanometer-sized structure, the fullerene-silica nanoparticles have good reactivity. Compared to heavy metals or metal nanoparticles, the fullerene-silica nanoparticles are harmless to a living body. Further, as the fullerene-silica nanoparticles exhibit strong fluorescence, they can be used as a bioimaging agent or as a drug delivery carrier.

BEST MODE

The present invention will be explained in greater detail below.

The present invention provides fullerene-silica nanoparticles with improved fluorescence in which fullerene and silica are covalently linked.

Figure 1:
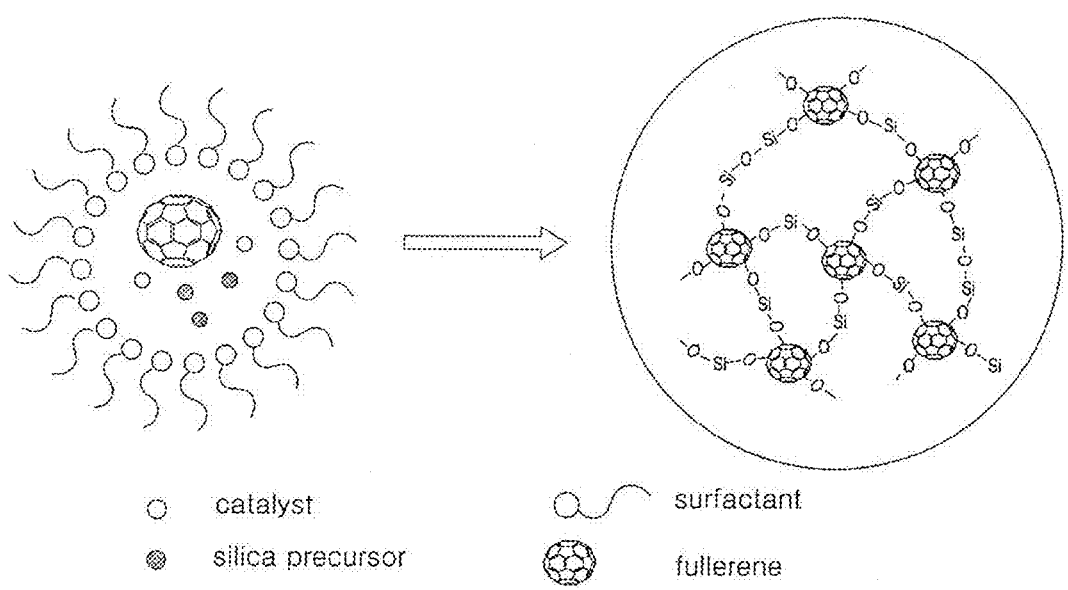
FIG. 1 shows a schematic view of fullerene-silica nanoparticles prepared according to the present invention.

Referring to FIG. 1, fullerene-silica nanoparticles of an embodiment are prepared inside of reverse micelles composed of surfactant, and the reverse micelles cause the fullerene-silica nanoparticles to be formed in a uniform spherical shape. Depending on the size of reverse micelles, the size of nanoparticles is decided.

In the fullerene-silica nanoparticles of one embodiment, the fullerene and silica are covalently linked. The linkage is simple, not easily separated, and exhibits unique fluorescence that cannot be exhibited in fullerene and silica.

$C_{60}$ fullerene generally absorbs lights in the regions of a ultraviolet ray and a visible ray, exhibits low fluorescence at 700 nm, and silica has no properties or emitting light. However, fullerene-silica nanoparticles of the present invention have optical properties to absorb lights of ultraviolet ray and visible ray regions and emit lights of a visible ray region.

To be specific, the fullerene-silica nanoparticles exhibit strong fluorescence at 500~700 nm and especially, exhibits the strongest fluorescence at 600 nm.

Figure 5:
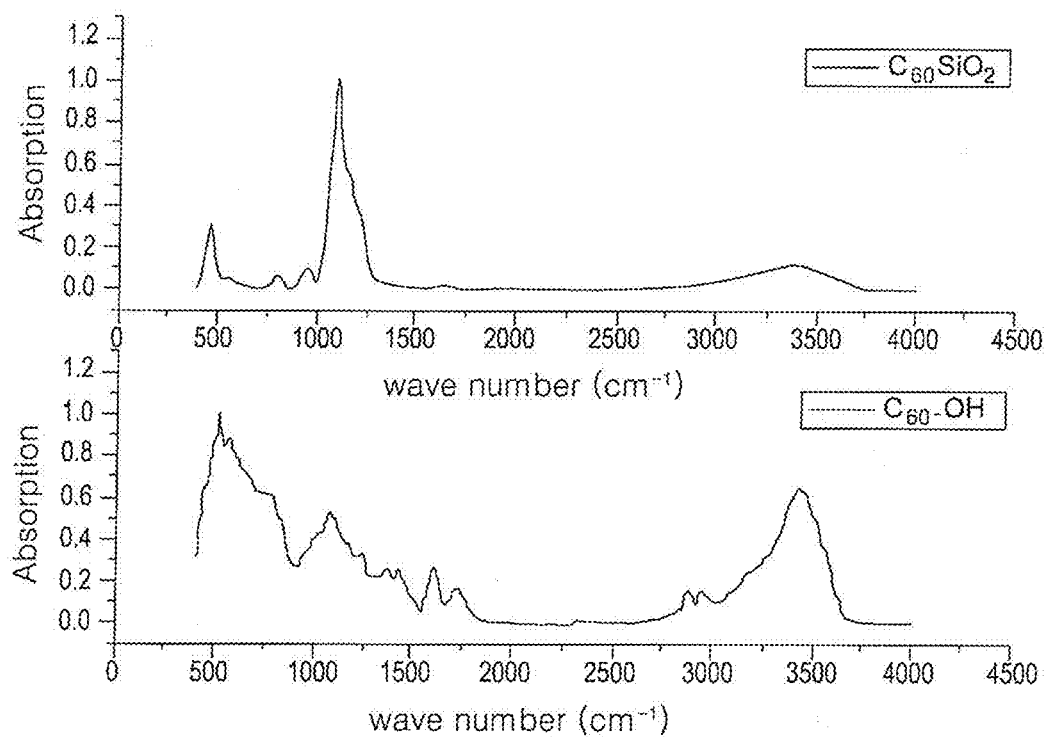
FIG. 5 illustrates a graphical representation of a infrared absorption spectroscopy (IR) of the fullerene-silica nanoparticles and fullerol, or an intermediate resultant.
Figure 6:
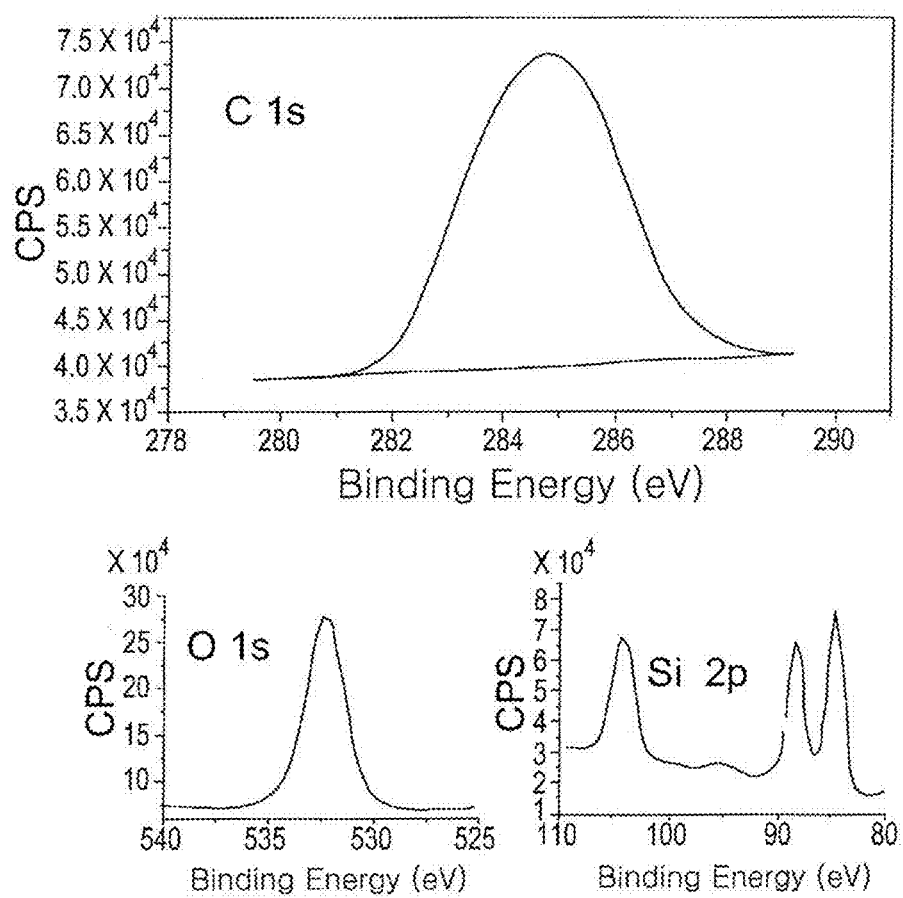
FIG. 6 illustrates a graphical representation of X-ray photoelectron spectroscopy (XPS) of fullerene-silica nanoparticles prepared according to an embodiment of the present invention.

With infrared spectrophotometer and X-ray photoelectron spectroscopy, properties of fullerene-silica nanoparticles were examined based on the analysis on the chemical constitution, and it was confirmed that fullerene and silica are linked with C—O—Si (see FIGS. 5 and 6).

Also, the present invention provides a preparation method of the fullerene-silica nanoparticles, which comprise the steps of: adding a surfactant to a non-polar organic solvent, and a polar solvent and stirring them to form reverse micelles (step 1);

adding fullerene to the reverse micelles formed in step and stirring them (step 2); and adding a silica precursor and a catalyst to a reaction solution containing the fullerene prepared in the step 2 and stirring them to prepare fullerene-silica nanoparticles (step 3).

The preparation method of the present invention is described below with reference to respective steps.

In the step 1, a surfactant is added to a non-polar organic solvent and a polar solvent and the resultant mixture is stirred to form reverse micelles.

Reverse micelles, which are aggregates of surfactant molecules dispersed in an organic solvent, solubilize water or hydrophilic materials, and adjust the size or shape of the aggregate according to the kinds of surfactants. Also, hydrophilic materials dispersed in reverse micelles can regulate a nucleus growth and the speed of the growth, and thermodynamically stable nanoparticles can be prepared.

According to the preparation method of the present invention, the nonpolar solvent may use toluene, cyclohexane, heptanes, isooctane, or decane.

According to the preparation method of the present invention, the polar solvent is used so that hydrophilic materials are dissolved in non polar organic solvents. The polar solvent may use alcohol such as propanol, butanol, heptanol, or hexanol.

According to the preparation method of the present invention, the surfactant forms an aggregate in oil and hydrophilic phase to form reverse micelles, and depending on the aggregate of surfactant, the size and the number of particles can be determined. The surfactant may be classified by the chemical structure and concentration. To be specific, the surfactant may be divided by the length of alkyl group, or the kinds and the position of functional group. Largely, the surfactant may be classified into anionic and non-ionic surfactants.

Nonionic surfactant may use TritonX-100 ($C_{14}H_{22}O$ $(C_2H_4O)_n$), nonylphenyl pentaethylene glycol, NP4, NP5, NP9, and anionic surfactant may use sodium Di(2-ethylhexyl) sulfosuccinate (OT(AOT)), or sodium dodecyl sulfate.

Also, to regulate interface strength, co-surfactant may be additionally used. A variety of co-surfactants such as sodium dodecyl sulfate or sodium dodecylbenzenesulfonate may be selected for use according to the chemical structure and concentration.

According to the preparation method of the present invention, the mixing ratio of the nonpolar organic solvent:polar solvent:surfactant may desirably be 2~8:1~5:1~3. If a ratio of the three does not correspond to the above ration, reverse micelles is not likely to be formed.

At step 2, fullerene is added to the reverse micelles formed at step 1 and the resultant mixture is stirred.

The fullerene is a material of fullerene-silica nanoparticles, and fullerenes of the fullerene family other than $C_{60}$, such as $C_{70}$, $C_{80}$, $C_{90}$ may also be used as a material of fullerene-silica nanoparticles. The fullerene family refers to symmetrical spherical shaped molecules composed of pure carbon atoms. Some fullerenes may not form a perfect symmetrical shape.

Fullerene dissolved in organic solvent may be used in the step 2. The solvent dissolving fullerene may be toluene, cyclohexane, heptanes, benzene, etc.

According to the preparation method of the present invention, concentration of the fullerene is desirably 0.00001~0.1 wt %. If the concentration is below 0.00001 wt %, fluorescent property is so low that the fullerene has no availability, and if the concentration is above 0.1 wt %, the growth of reverse micelles, which form nanoparticles, is hindered.

In the step 3, a silica precursor and a catalyst are added to a reaction solution containing the fullerene prepared at step 2 and the resultant mixture is stirred to prepare fullerene-silica nanoparticles.

According to the preparation method of the present invention, the silica precursor is a material of nanoparticles. Depending on kinds of the silica precursors, the shape and size of fullerene-silica nanoparticles may be determined. The silica precursor may use tetraethyl orthosilicate (TEOS), tetrametheyl orthosilicate (TMOS), ortetrapropyl orthosilicate (TPOS), but not limited thereto.

According to the preparation method of the present invention, the catalyst hydrolyzes silica precursor in the reverse micelles to form silica nanoparticles, and fullerene is also combined with silica to form fullerene-silica nanoparticles. The catalyst is desirably ammonia aqueous solution, and preferably 25~30 wt %.

To remove reverse micelles surrounding the fullerene-silica nanoparticles, alcohol such as methanol or ethanol or alcohol acceptor may be further added and stirred to achieve fullerene-silica nanoparticles according to the present invention.

Figure 2:
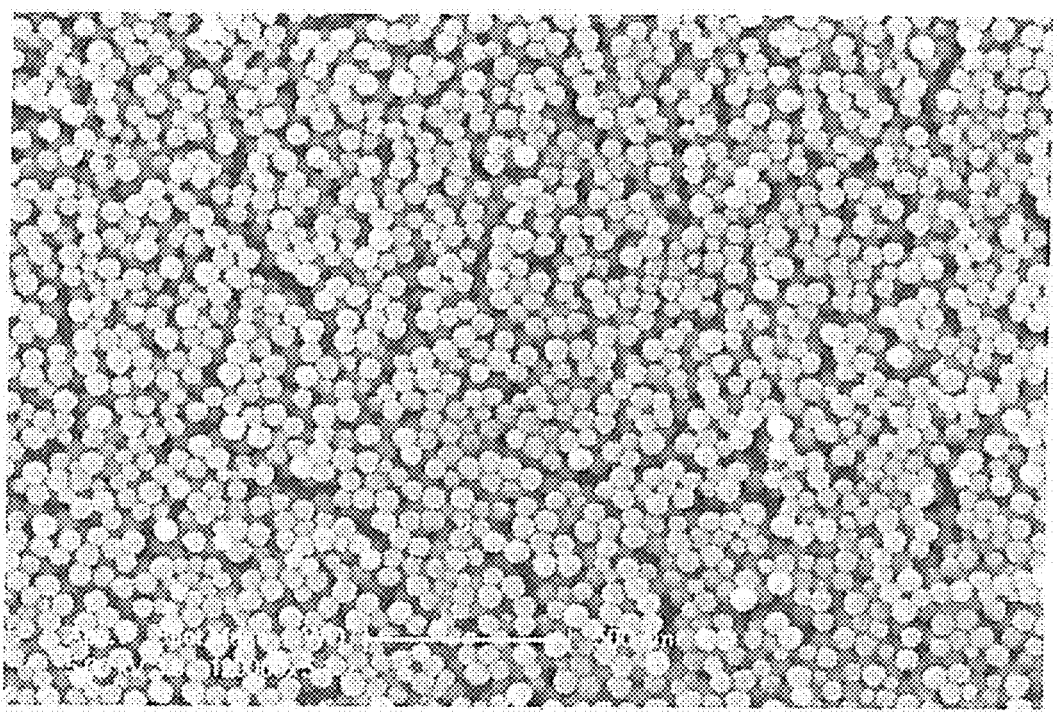
FIG. 2 shows an image of fullerene-silica nanoparticles prepared according to an embodiment of the present invention taken by scanning electron microscope (SEM).

As disclosed in FIG. 2, fullerene-silica nanoparticles, prepared by the above method, form with a uniform spherical shape and size corresponding to several tens of nanometers.

Figure 3:
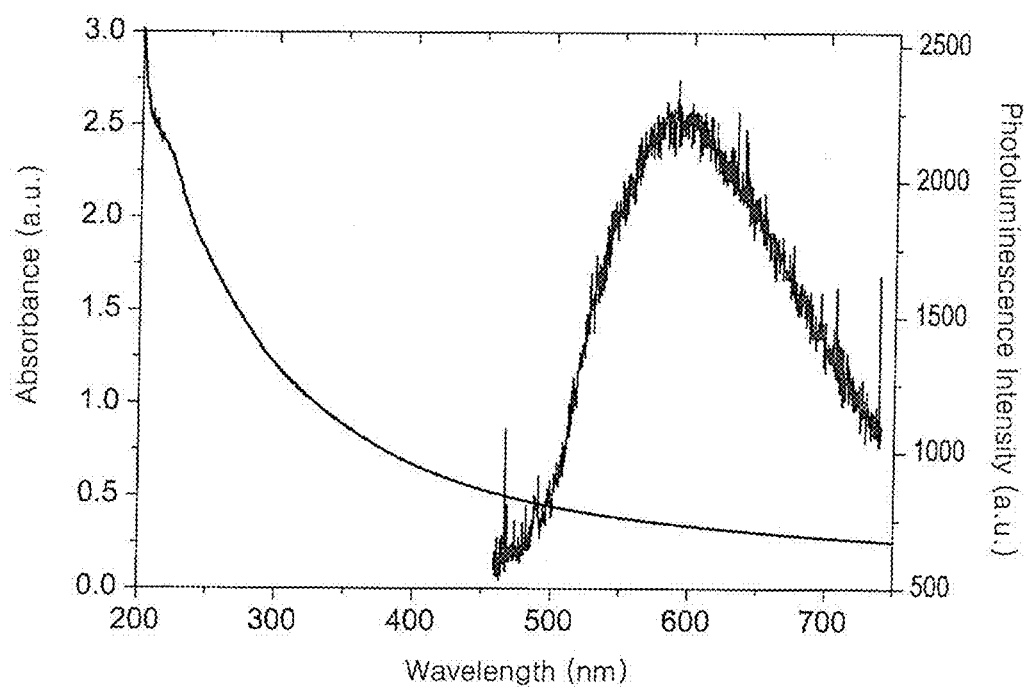
FIG. 3 illustrates a graphical representation of absorption and fluorescence of fullerene-silica nanoparticles prepared according to an embodiment of the present invention.
Figure 4:
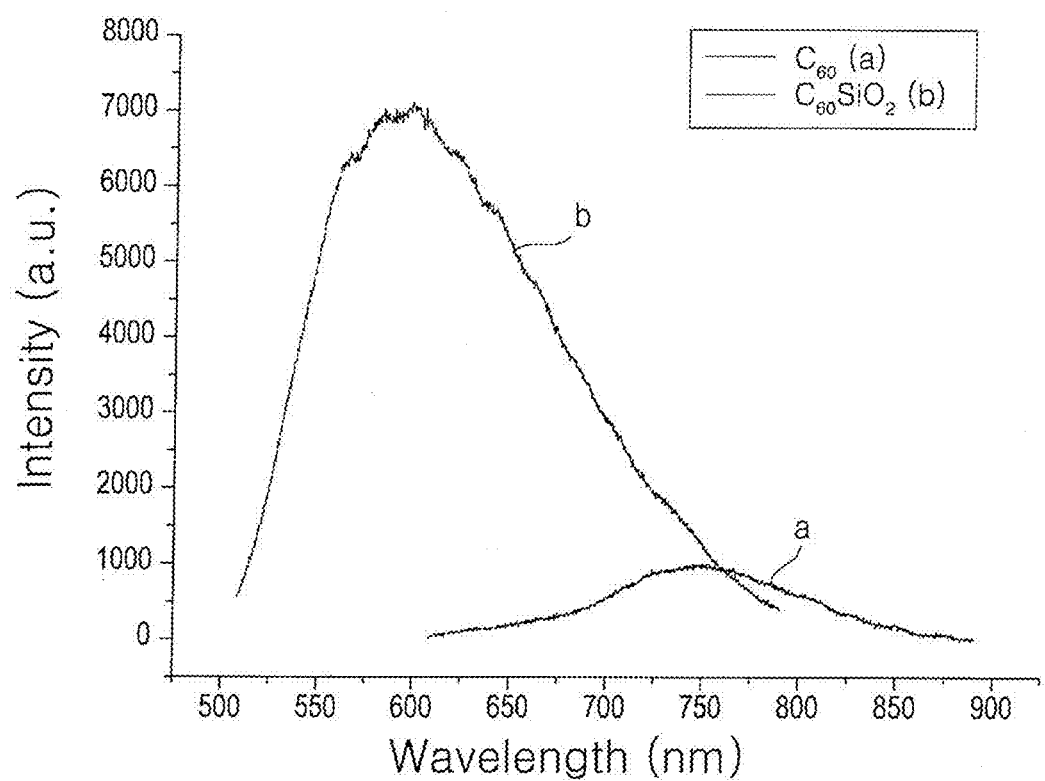
FIG. 4 illustrates a graphical representation of fluorescence of the fullerene-silica nanoparticles and $C_{60}$ fullerene prepared according to an embodiment of the present invention.

Also, as disclosed in FIGS. 3 and 4, the fullerene-silica nanoparticles of the present invention exhibit unique fluorescence which is exhibited from neither fullerene nor silica. To be specific, the fullerene-silica nanoparticles exhibit strong fluorescence at 500~700 nm, and particularly exhibit the strongest fluorescence at 600 nm.

Since such prepared fullerene-silica nanoparticles have a large surface area due to a nanometer-sized structure, the fullerene-silica nanoparticles have good reactivity. Compared to heavy metals or metal nanoparticles, the fullerene-silica nanoparticles are also harmless to a living body.

Therefore, such prepared fullerene-silica nanoparticles can be used as a bioimaging agent (see FIG. 8), and a drug delivery carrier (not illustrated) with strong fluorescence and characteristics of nanoparticles.

MODE FOR INVENTION

The present inventive technical concept will be explained in greater detail below based on the exemplary embodiments which are not to be construed as limiting the present inventive concept.

Example 1

Preparation of Fullerene-Silica Nanoparticles

Mixed solution comprising 5.5 ml, of cyclohexane, 2.2 mL of hexanol, 1.7 mL of TritonX-100 and 0.5 ml of water was added with 2 mL of 0.1% $C_{60}$ fullerene solvent and stirred to form a reverse microemulsion. 100 µL of tetraethyl orthosilicate and 60 µl, of 28 wt % was added to the reverse microemulsion and then stirred for 20 hours. After the stirring, 20 mL of 99% ethanol was added to the above reverse microemulsion and stirred for 2 more hours, and fullerene-silica nanoparticles were formed. A surfactant surrounding the fullerene-silica nanoparticles was dissolved. From the nanoparticles solution, nanoparticles were gathered from the reaction solution by a centrifugal separator. To remove the unreacted molecules, 20 ml of ethanol was added, separated, and nanoparticles were gathered by centrifugal separator. The above process was done for 3 times and pure yellow nanoparticles were obtained.

<Analysis>

The nanoparticles were dispersed in ethanol, some of nanoparticles were collected, dropped on silicon wafer, dried, and examined with scanning electron microscope. The result was disclosed in FIG. 2.

As disclosed in FIG. 2, nanoparticles 65 nm in diameter were confirmed.

To examine the properties of the fullerene-silica nanoparticles, test of chemical compositions and thermal stability test were done. To confirm the chemical composition, infrared spectrophotometer and X-ray photoelectron spectroscopy were used.

The infrared spectra of the fullerene-silica nanoparticles are illustrated in FIG. 5.

Referring to FIG. 5, peaks appear on the infrared spectra of fullerene-silica nanoparticles as follows: 469 (Si—O—Si bend), 800 (Si—I—C symmetric stretch), 953 (Si—OH), 1100~1300 (Si—O—Si asymmetric stretch), Si—O—C asymmetric stretch, 1629 (OH bend), 3400 (OH stretch) $cm^{-1}$. Among these, Si—O—Si and Si—O—C peaks overlap with each other in many parts and are not easily distinguishable. However, compared to the infrared spectrum of fullerol $(C_{60}(OH)_n)$ which was synthesized without adding silica precursor, 1974 (C—O stretch) $cm^{-1}$ and 3400 (OH stretch) $cm^{-1}$ appeared as well as the four peaks 527, 575, 1182, 1428 $cm^{-1}$. This indicates that C=C linkage of fullerene was broken due to ammonium hydroxide, reacted with hydroxyl group, and C—O linkage was formed. Therefore, this indicates that during the synthesis of fullerol-silica nanoparticles, Si—O—C linkage was formed by the linkage of C—O of fullerol in the process of forming Si—O linkage in the process of silica precursor forming silica network.

To support the above, XPS of fullerene-silica nanoparticles was measured and curve fitting of C 1s, O, 01s, Si 2p was done. As disclosed in FIG. 6, peaks of 283.9 eV (16.24%) and 285.0 eV (83.76%) appear at C is, indicating double linkage of C=C—C of backbone of fullerene and mono-oxygenated fullerene (C—O). Also, FIG. 6 confirms that fullerene-silica nanoparticles consists of C, O and Si, based on 104.08 eV peak representing silica (SiO2) at silicon 2p area, and 532.0 eV peak representing oxygen combined with silica at oxygen is region.

Figure 7:
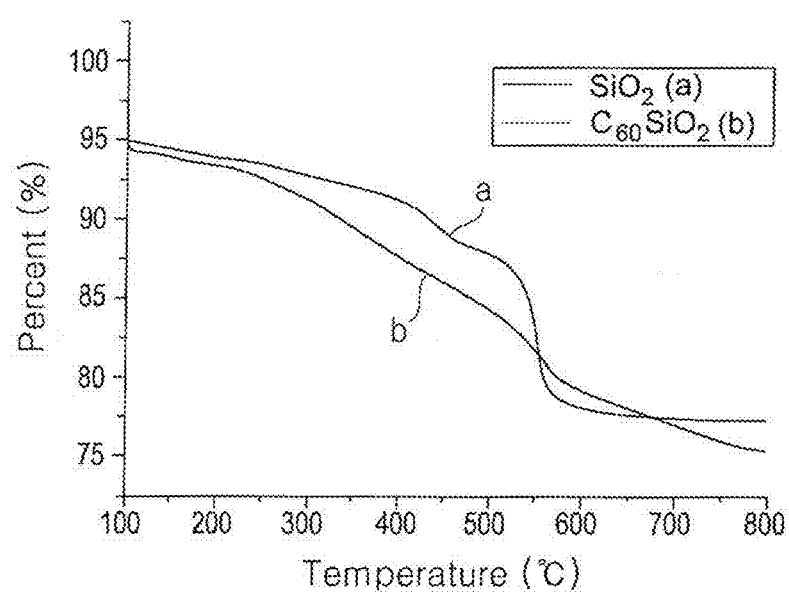
FIG. 7 illustrates a graphical representation of thermogravimetric analysis (TGA) of fullerene-silica nanoparticles prepared according to an embodiment of the present invention and pure silica nanoparticles.

Also, with thermal gravity analysis, thermal properties of fullerene-silica nanoparticles and pure silica nanoparticles were compared, and the result is illustrated in FIG. 7.

As illustrated in FIG. 7, the weight of silica was noticeably decreased between 540 and 560° C., due to a decomposition silianol (SiOH). However, the weight of fullerene-silica nanoparticles gradually decreases between 300 and 600° C., due to the complex decompositions of carbon monoxide (CO), carbon dioxide ($Co_2$), silanol (SiOH) according to organic network of carbon, oxygen and silicon of fullerene. Given the fact that the decreased weight, of fullerene-silica nanoparticles was noticeably higher compared to decreased weight of pure silica nanoparticles, it was confirmed that fullerene, dispersed in fullerene-silica nanoparticles, was dispersed all over the particles, and not the outside of the particles.

Example 2

Preparation of Fullerene-Silica Nanoparticles with Different Concentration of Fullerene Except that the concentration of $C_6$ fullerene was varied from 0.00001% to 0.1 wt %, the same method as the one applied in example 1 was used to prepare fullerene-silica nanoparticles.

With scanning electron microscope, it was confirmed that such prepared nanoparticles had the same size and shape regardless of the different concentration of fullerene (not shown).

Example 3

Preparation of Fullerene-Silica Nanoparticles Including Fullerenes with Different Molecule Weights Except that $C_{70}$ fullerene was used, the same method as the one applied in example 1 was used to prepare fullerene-silica nanoparticles.

Experiment 1

Measurement of Fluorescence of Fullerene-Silica Nanoparticles

With UV/Visible spectrophotometer and fluorescence spectroscopy installed with argon laser, the optical properties of such prepared fullerene-silica nanoparticles were examined, and the result is illustrated in FIG. 3.

Referring to FIG. 3, such prepared fullerene-silica nanoparticles absorbed ultraviolet, rays and emitted visible rays. To be specific, the nanoparticles absorbed light at 300~360 nm of ultraviolet ray region, and emitted light at a wide range of 500~700 nm, and emitted the maximum light at 600 nm.

Also, fullerene and such prepared fullerene-silica nanoparticles were measured with fluorescence spectroscopy, and the result is illustrated in FIG. 4. 488 nm of light was excited, and fullerene was measured at 200 µW, and fullerene-silica nanoparticles were measured at 10 µW.

Referring to FIG. 4, fullerene emitted lights at 600~90 nm, but with weak strength. However, the fullerene-silica nanoparticles prepared according to the present invention emitted lights at 500~700 nm, and especially emitted the strongest light at 600 nm with the strength 140 times higher than that of the fullerene.

Experiment 2

Measurement of Fluorescence of Fullerene-Silica Nanoparticles Having Different Concentration of Fullerene The following experiment was done to examine fluorescence properties of fullerene-silica nanoparticles according to different concentrations of fullerene, according to an embodiment of the present invention.

Fluorescence of fullerene-silica nanoparticles having different concentration of fullerene as prepared at the experiment 2 was measured with fluorometer, and the result is illustrated in table 1 below.

TABLE 1

| Concentration of fullerene (%) | Strength of fluorescence |
|---|---|
| 0.005 | 380 |
| 0.01 | 640 |
| 0.02 | 970 |
| 0.04 | 1200 |

Referring to table 1 above, it was confirmed that the strength of fluorescence decreases as the concentration of fullerene added to fullerene-silica nanoparticles decreases.

Experiment 3

Cell Imaging Using Fullerene-Silica Nanoparticles

The following experiment was done to apply the fluorescence properties of the fullerene-silica nanoparticles prepared according to the present invention for cell imaging.

Figure 8:
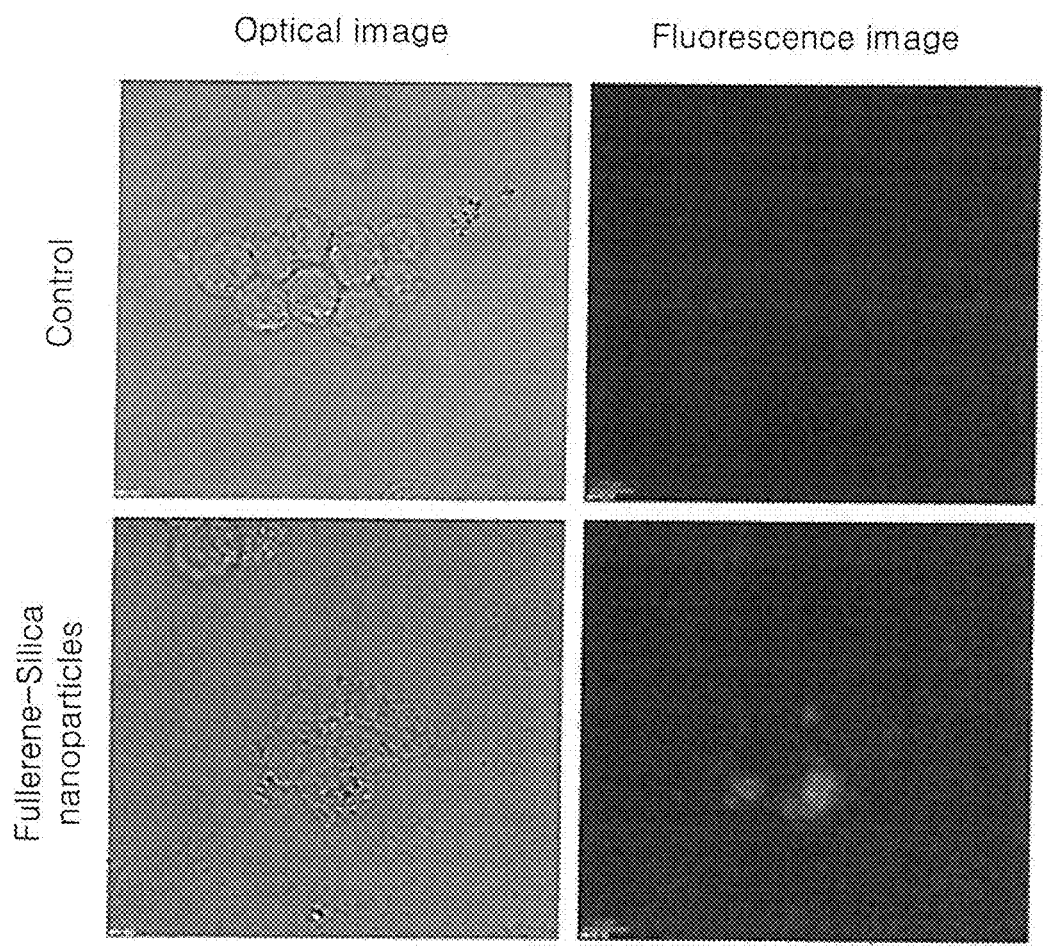
FIG. 8 shows a cell imaging picture of fluorescence of the fullerene-silica nanoparticles prepared according to an embodiment of the present invention.

Fullerene-silica nanoparticles prepared according to the embodiment of the present invention and a control group which did not include fullerene-silica nanoparticles were cultured in microphage (RAW264.7), respectively. After 20 hours, each cultured solution was discarded to remove the unabsorbed nanoparticles, and cells were washed with buffered solution several times, and the cells were examined with a fluorescence microscope. The result is illustrated in FIG. 8.

Fluorescence signal, which was incident at 488 nm, and emitted at 617 nm, was examined with filter. As shown in FIG. 8, cells without nanoparticles did not exhibit fluorescence, but cells added with fullerene-silica nanoparticles of the present invention exhibited fluorescence along with cell shape. The result confirmed that by the macrophagocyte, fullerene-silica nanoparticles were absorbed inside the cells, and cell imaging was confirmed to be possible with examining the fluorescence properties of fullerene-silica nanoparticles inside of cells.

The invention claimed is:

1. Fullerene-silica nanoparticles with fluorescence having a uniform spherical shape in which fullerene and silica are directly linked through C—O—Si—[O—Si]$_n$—O—C covalent bonds without linkers,
   wherein n=0 or 1, and the fullerene has a plurality of C—OH terminal substituents from the result of reaction between the fullerene and ammonium hydroxide, wherein the C is from the fullerene and the OH is from the ammonium hydroxide.

2. The fullerene-silica nanoparticles of claim 1, wherein the fluorescence properties comprise optical properties to absorb light in visible ray and ultraviolet ray regions and to emit light in the visible ray region.

3. A method for preparing the fullerene-silica nanoparticles of claim 1, the method comprising steps of:
   adding a surfactant to a non-polar organic solvent and a polar solvent and stirring them to form reverse micelles (step 1);
   adding fullerene to the reverse micelles formed in the step 1 and stirring them (step 2); and
   adding a silica precursor and a catalyst to a reaction solution containing the fullerene prepared in the step 2 and stirring them to prepare fullerene-silica nanoparticles (step 3).

4. The method of claim 3, wherein the non-polar organic solvent in the step 1 is selected from the group consisting of toluene, cyclohexane, heptane, isooctane, and decane.

5. The method of claim 3, wherein the polar solvent in the step 1 is an alcohol.

6. The method of claim 5, wherein the alcohol is butanol, heptanol, or hexanol.

7. The method of claim 3, wherein the surfactant in the step 1 is a nonionic surfactant or an anionic surfactant,
wherein
the nonionic surfactant is TritonX-100 ($C_{14}H_{22}O(C_2H_4O)_n$) or nonylphenyl pentaethylene glycol (NP4, NP5, NP9); and
the anionic surfactant is sodium di(2-ethylhexyl)sulfonic succinate or sodium dodecyl sulfate as a sulfate.

8. The method of claim 3, wherein co-surfactant is further included to regulate an interface strength.

9. The method of claim 3, wherein a mixing ratio of the nonpolar organic solvent: polar solvent: surfactant is 2~8:1~5:1~3.

10. The method of claim 3, wherein the fullerene of the step 2 is C60, C70, C80 or C90 fullerenes.

11. The method of claim 3, wherein the fullerene in the step 2 is added by being dissolved in a solvent selected from the group consisting of toluene, cyclohexane, heptane, and benzene.

12. The method of claim 3, wherein a concentration of the fullerene in the step 2 is 0.00001~0.1 wt %.

13. The method of claim 3, wherein the silica precursor in the step 3 is tetraethyl orthosilicate (TEOS), tetramethyl orthosilicate (TMOS), or tetrapropyl orthosilicate (TPOS).

14. The method of claim 3, wherein the catalyst in the step 3 is ammonia aqueous solution.

15. The method of claim 14, wherein the ammonia aqueous solution is 25~30 weight % ammonia aqueous solution.

16. A bioimaging agent comprising the fullerene-silica nanoparticles of claim 1.

* * * * *

UNITED STATES PATENT AND TRADEMARK OFFICE
CERTIFICATE OF CORRECTION

PATENT NO. : 8,715,738 B2  
APPLICATION NO. : 12/993908  
DATED : May 6, 2014  
INVENTOR(S) : Chung et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 608 days.

Signed and Sealed this

Twenty-ninth Day of September, 2015

Michelle K. Lee  
*Director of the United States Patent and Trademark Office*